(12) United States Patent
Bertin

(10) Patent No.: US 11,305,471 B2
(45) Date of Patent: Apr. 19, 2022

(54) RESIN SUPPLY SYSTEMS

(71) Applicant: COEXPAIR S.A., Namur (BE)

(72) Inventor: André Bertin, Namur (BE)

(73) Assignee: COEXPAIR S.A., Namur (BE)

( * ) Notice: Subject to any disclaimer, the term of this patent is extended or adjusted under 35 U.S.C. 154(b) by 411 days.

(21) Appl. No.: 16/194,799

(22) Filed: Nov. 19, 2018

(65) Prior Publication Data

US 2019/0152111 A1    May 23, 2019

(30) Foreign Application Priority Data

Nov. 20, 2017 (WO) ................. PCT/EP2017/079807

(51) Int. Cl.
*B29C 45/46* (2006.01)
*B29C 45/03* (2006.01)
(Continued)

(52) U.S. Cl.
CPC ............ *B29C 45/463* (2013.01); *B29C 45/02* (2013.01); *B29C 45/03* (2013.01);
(Continued)

(58) Field of Classification Search
CPC ..... B29C 45/20; B29C 45/463; B29C 45/586; B29C 45/531
See application file for complete search history.

(56) References Cited

U.S. PATENT DOCUMENTS 2,287,277 A * 6/1942 Ryder .................... B29C 45/463
264/238
2,327,079 A * 8/1943 Wacker ................. B29C 45/463
264/328.14
(Continued)

FOREIGN PATENT DOCUMENTS

DE    102006018402 A1    10/2007
EP          0665584 A1 *  8/1995   ....... B29C 45/14655
(Continued)

OTHER PUBLICATIONS

Brouwer, W. D, E. C. F. C. Van Herpt, and M. Labordus. "Vacuum injection moulding for large structural applications." Composites Part A: Applied Science and Manufacturing 34.6 (May 22, 2003): 551-558. (Year: 2003).*

(Continued)

*Primary Examiner* — Benjamin A Schiffman
(74) *Attorney, Agent, or Firm* — Patrick J. Daugherty; Daugherty & Del Zoppo Co. LPA

(57) ABSTRACT

Resin supply system in which resin material is stored in a pouch in a degassed state ready for use. The pouch comprises a body portion forming a reservoir for resin material and a connector portion in fluid communication therewith. The connector portion includes an outlet which is configured to be connected to an injector head of an injector assembly, the injector head being connectable to a mould by means of connecting tubing to provide a resin supply thereto. The pouch is configured to be mountable in a housing of the injector assembly and is compressed by hydrostatic pressure of water surrounding the pouch in a chamber of the housing. The application of pressure by a piston moving in a direction transfers pressure to the water and then to the pouch in a controlled manner to provide the resin supply to the mould. After use, the pouch is removed and discarded thereby substantially eliminating the need for cleaning of the housing after use.

20 Claims, 7 Drawing Sheets

(51) Int. Cl.
   *B29C 45/63*   (2006.01)
   *B29C 70/48*   (2006.01)
   *B29C 45/53*   (2006.01)
   *B29C 45/20*   (2006.01)
   *B29C 70/54*   (2006.01)
   *B29C 45/02*   (2006.01)
   *B29C 45/18*   (2006.01)
   *B29C 45/77*   (2006.01)
   *B29C 31/04*   (2006.01)
   *B29C 45/17*   (2006.01)
   *B29C 31/06*   (2006.01)
   *B29C 37/00*   (2006.01)

(52) U.S. Cl.
   CPC .......... *B29C 45/1808* (2013.01); *B29C 45/20* (2013.01); *B29C 45/53* (2013.01); *B29C 45/531* (2013.01); *B29C 45/63* (2013.01); *B29C 45/77* (2013.01); *B29C 70/48* (2013.01); *B29C 70/54* (2013.01); *B29C 31/04* (2013.01); *B29C 31/06* (2013.01); *B29C 37/006* (2013.01); *B29C 45/176* (2013.01); *B29C 45/1858* (2013.01); *B29C 2045/1792* (2013.01); *B29C 2945/76006* (2013.01); *B29C 2945/7618* (2013.01)

(56) References Cited

U.S. PATENT DOCUMENTS

| | | | | |
|---|---|---|---|---|
| 2,338,607 | A * | 1/1944 | Wacker | B29C 45/463 264/328.14 |
| 5,043,199 | A * | 8/1991 | Kubota | B29C 45/463 428/76 |
| 5,888,443 | A * | 3/1999 | Bolanos | B29C 45/463 264/328.5 |
| 6,071,457 | A * | 6/2000 | Bednarz | B29B 11/14 264/272.17 |
| 7,156,637 | B1 * | 1/2007 | Kutsch | A61C 13/206 264/17 |
| 2018/0050475 | A1 * | 2/2018 | Kara | B29C 45/1706 |

FOREIGN PATENT DOCUMENTS

| | | | | |
|---|---|---|---|---|
| EP | 2645500 | A1 | 10/2013 | |
| EP | 2956380 | A1 | 12/2015 | |
| FR | 2272322 | A1 | 12/1975 | |
| FR | 2495052 | A1 * | 6/1982 | ........... B29C 45/463 |
| FR | 2702604 | A1 | 9/1994 | |
| GB | 2481046 | A | 12/2011 | |
| JP | 09117931 | A * | 5/1997 | ....... B29C 45/14655 |
| JP | 09248838 | A * | 9/1997 | ........... B29C 45/463 |
| JP | 10172996 | A * | 6/1998 | ........... B29C 45/463 |
| WO | WO-9527447 | A1 * | 10/1995 | ........... B29C 45/463 |
| WO | WO20160555473 | A1 | 4/2016 | |
| WO | WO2016102387 | A1 | 6/2016 | |

OTHER PUBLICATIONS

Yusuf, Md Afendi M. "The Effect of Micro-Bubbles Elimination Prior Resin Infusion Process." Jurnal Mekanikal 24.2 (Dec. 2007). (Year: 2007).*

Sul, In Hwan, Jae Ryoun Youn, and Young Seok Song. "Bubble development in a polymeric resin under vacuum." Polymer Engineering & Science 52.8 (Mar. 27, 2012): 1733-1739. (Year: 2012).*

ISA/EP International Search Report dated Jul. 3, 2018 re PCT Application No. PCT/EP2017/079807, filed Nov. 20, 2017.

* cited by examiner

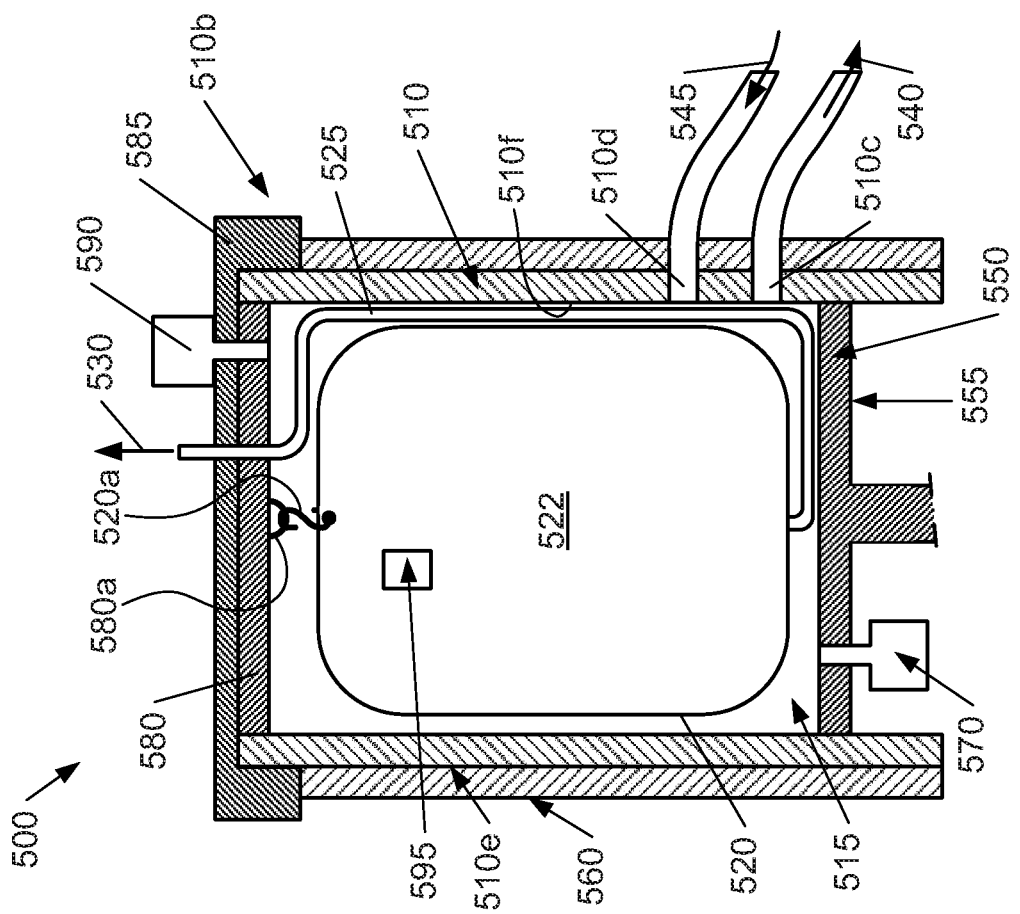

RESIN SUPPLY SYSTEMS

FIELD OF THE INVENTION

The present invention relates to improvements in or relating to resin supply systems, and is more particular, although not exclusively, concerned with resin supply systems for resin transfer moulding (RTM) and/or same qualified resin transfer moulding (SQRTM) injection systems.

BACKGROUND OF THE INVENTION

Epoxy resin is widely used in many industries, and, are categorised as being self-reactive products. By the term "self-reactive" is meant that the resin ages, degrades and/or sets when it is above a certain mass or volume and is exothermic. This means that only relatively small amounts of resin, for example, up to 10 kg, are handled in resin transfer moulding (RTM) and same qualified resin transfer moulding (SQRTM) processes.

In RTM processes, resin is injected into a mould from a resin reservoir in a cartridge or housing arranged to be located close to the mould. Resin is placed in the cartridge or housing and is heated so that the resin reservoir attains an injection temperature, typically, between 80° C. and 120° C., and is degassed to remove any air in the reservoir prior to injection. The degassing process may also remove any residual water and/or acetone remaining in the cartridge or housing after it was cleaned after a previous injection process, and before the resin is placed therein for the next injection process. The resin may be degassed before it is placed in the cartridge or housing. Alternatively, the resin may be degassed after it has been placed in the cartridge or housing. The injection process is controlled by a piston within the cartridge or housing and which applies pressure to the resin in the resin reservoir to force it out of the cartridge or housing and into the mould.

US-A-2014/0117571 describes a re-usable cartridge assembly for use with an RTM injector in which resin preparation and processing can be prepared offline and does not affect the cycle time of the injector. The cartridge assembly comprises a housing with an injector head configured to be connected to the RTM injector to provide resin thereto and a piston configured to be moved by a piston arrangement to transfer resin from the cartridge to the RTM injector. Once the resin within the housing has been used, the cartridge assembly is cleaned and refilled prior to its next use. Whilst filled cartridge assemblies may be placed in cold storage until ready to be used, and, when selected for use, the resin in a cartridge assembly is heated to an appropriate temperature for injection into a mould.

However, cleaning such cartridge assemblies is time-consuming as both the injector head and the piston need to be removed from the housing, the injector head and the piston cleaned and, then re-assembled after cleaning. During cleaning, the resin remaining in the housing must be removed using acetone which necessitates the wearing of protective clothing for this purpose.

The re-assembled cartridge assembly must then be tested to ensure that it is fully sealed prior to filling the housing with a measured amount of resin, and then sealing the cartridge assembly for storage. Filling the cartridge assembly may be hazardous as the resin must be heated prior to filling the cartridge and is transported from a heating station to the cartridge whilst hot. Care must be taken as the resin is exothermic. In addition, the resin must be degassed whilst in the cartridge assembly (typically between 15 and 30 minutes prior to injection under vacuum at a temperature between 80° C. and 120° C. to prevent bubbles appearing as defects in the injected component made of the resin. Moreover, the line from the cartridge to the mould must be free of any air so that the risk of defects in the final component is minimised.

SQRTM is a closed moulding process combining pre-form processing and liquid moulding to produce an autoclave-quality part without the need for an autoclave. Such parts are suitable for use in the aerospace industry. The pre-form has already been shaped and impregnated with resin prior to insertion into the mould. Once the mould is closed and pressure and heat applied, only a small additional quantity of resin needs to be injected around the part in order to exert the hydrostatic pressure necessary to consolidate the pre-form in the mould and eliminate any gas bubbles that may form during the setting of the resin. In effect, the additional resin is used to maintain pressure within the mould as the part cures under heat and pressure. The additional resin in injected from a cartridge or a housing as described above with reference to RTM.

In both RTM and SQRTM processes, the cartridge or housing is typically mounted on a trolley with a small quantity of resin in the resin reservoir so that it can readily be moved into a safety area in case the resin becomes too reactive. The safety issue is addressed by having a moveable trolley which can be removed from the working area to a safe area. In addition, the use of small quantities of resin for the injection process reduces the amount of hot reactive resin material which can become exothermic.

In RTM and SQRTM processes, resin flow from the cartridge or housing to the mould needs to be carefully controlled, and, one solution is to use a stepper motor to operate the movement of the piston to eject resin from the cartridge or housing. The pressure in the resin material is monitored in order to determine the flow. In many cases, a controlled pneumatic pressure may be applied directly on the resin or may be used to operated the piston. However, with controlled pneumatic pressure, if a higher temperature and/or flow rate is detected during the injection process, it is difficult to reduce the pressure applied to the resin material to compensate for the higher temperature and/or flow rate.

When the resin is pre-loaded into the cartridge or housing, it is still essential to degas the resin material before it is pre-loaded in the cartridge or housing by applying a vacuum and heat, for example, to a temperature of approximately 120° C. which is in excess of injection moulding temperatures, Resin as such a temperature needs to be carefully monitored and handled carefully due to its exothermic reactivity.

SUMMARY OF THE INVENTION

It is an object of the present invention to provide solutions to the problems of the injection systems of the prior art.

It is an object of the present invention to provide a reservoir of resin material which can readily be attached to an injector head for dispensing resin material at a precisely-controlled rate and which eliminates the need for cleaning of an injector assembly between injection processes.

It is another object of the present invention to provide an injector assembly in which the reservoir of resin material can readily be connected and a resin supply provided therefrom in which no time-consuming disassembly and re-assembly is required.

It is yet another object of the present invention to provide a disposable resin reservoir in which the resin is supplied in a degassed form.

It is a further object of the present invention to provide precise flow control for resin being injected from an injector assembly.

It is yet a further object of the present invention to provide a method of using the injector assembly to dispense resin material to a mould to which it is connected which is more efficient than known methods.

In accordance with one aspect of the present invention, there is provided a pouch for use in an injector assembly, the pouch comprising: a body portion configured to form a material reservoir for a material to be injected; and a connector portion configured to be in fluid communication with the body portion for providing a material supply from the material reservoir in the body portion; wherein the body portion is configured to be compressible to provide the material supply through the connector portion in accordance with applied hydrostatic pressure.

By having a pouch as a reservoir for injectable material, the disadvantages of having to clean the injector (or cartridge) assembly is overcome as no cleaning is required.

In one embodiment, the pouch further includes connecting tubing attached to the connector portion. In this way, the pouch can be directly be connected to a mould.

In a further embodiment, a shut-off valve is provided in the connecting tubing remote from the body portion. This has the advantage that a complete system can be provided which is connectable to the mould and once the curing has been completed, any material in the shut-off valve sets allowing the valve and any hot material in the connecting tubing to be disconnected without any risk of hot material being escaping from the system.

The body portion of the pouch is configured to be compressible to provide the material supply through the connector portion. As a result, the material from which the body portion is made is soft and supple and may be relatively inexpensive. The body portion is configured to be conductive to transfer heat to the material in the resin material reservoir.

An identifier may be provided on the pouch which is configured to provide information about the injectable material within body portion. Such information may relate to the type of material, its manufacturing date, its storage date, etc., and can provide a check to ensure that the pouch is genuine and not a copy or has been refilled.

The body portion may comprise one of: polyurethane, natural rubber, polybutadiene, neoprene, silicone, polypropylene, polyethylene (low density, medium density, high density or a combination thereof), polyvinyl chloride, polyester (for example, a biaxially oriented polyester BoPET), nylon, polyethylene terephthalate (PET) or a combination thereof.

The connector portion may comprise a rigid form of the same material as the body portion or may comprise a different material to the body portion.

The connector portion may comprise a heat-conductive material, such as, a metal. In one embodiment, the connector portion comprises a first portion located within the body portion and a second portion located external to the body portion, the first and second portions being configured to be connected together with the body portion being retained between the first and second portions.

In an embodiment, the connector portion comprises an elongate tube configured to be attached to a portion of the body portion. In this embodiment, the pouch may further comprise attachment means positioned at a location on the body portion remote from the elongate tube.

The injectable material may comprise a thermosetting resin material. The thermosetting resin material is degassed and sealed within the body portion until it is to be injected.

As the resin material in the pouch can be degassed prior to storage, there is no need to degas the resin material again prior to use. Typically, the pouch can be stored at different temperatures without risk, for example, in cold storage at around −18° C., at what is considered to be cold (or room temperature) at around 20° C., and can be heated prior to use at around 60° C. In addition, the resin material may be heated at the time of use in the injector assembly.

The pouch can be used with existing injector systems where an injector assembly is implemented for dispensing the injectable material. As a retrofit, the pouch is simply connected to the injector head of the injector assembly by means of its connector portion with the body portion located within the housing of the injector system. Pressure applied to the housing causes the resin material to be dispensed from the pouch.

In accordance with another aspect of the present invention, there is provided an injector assembly comprising:

a housing having a distal end and a proximal end;

a chamber formed within the housing, the chamber being configured to have an adjustable volume;

a piston configured to be located at the distal end of the housing and configured for adjusting the volume of the chamber by movement thereof relative to the proximal end of the housing;

an injector head configured for retaining the pouch as described above within the housing; and a motor configured to control the movement of the piston within the chamber;

wherein the piston is configured to apply a hydrostatic pressure to the body portion of the pouch, and the chamber further comprises a pressure sensor for sensing the hydrostatic pressure within the chamber.

As described above, the use of such a pouch in an injector assembly eliminates cleaning of the housing and associated components after use as all the resin material is retained within the pouch and any connecting tubing.

Moreover, by reducing the volume of the sealed housing when both the piston and the injector head are located at respective ends of the housing, pressure is applied to the pouch to provide a resin supply for a mould to which the injector assembly is connected.

In one embodiment, the injector head comprises a heated injector head configured for heating material within the material reservoir prior to the supply of material from the connector portion. By having a heated injector head, the material in the reservoir can be heated close to the connector portion and will be sufficiently fluid (low viscosity) to flow through the connector portion and associated connecting tubing to a mould.

The injector assembly further comprises a locking mechanism configured for securing the injector head to the housing. In one embodiment, the injector head includes a locking mechanism configured for securing the injector head to the housing. The locking mechanism ensures that the injector head is sealed within the housing so that injection pressures exerted by the piston can be accommodated safely.

In one embodiment, the injector head comprises a first portion and a second portion hingedly connected to one another, the first and second portions being configured to move relative to one another between an open position and a closed position and defining an aperture in the closed position through which the connector portion of the pouch is configured to extend.

By having a split injector head, it is possible to readily enclose and mount the pouch within the chamber of the housing. In this embodiment, the connector portion of the pouch may be directly connected to a hose configured for supplying injectable material to a mould.

The first and second portions are configured to seal against one another and against the connector portion of the pouch when in the closed position.

The seals provided ensure that the housing of the injector assembly is able to maintain high pressure therein to provide a precisely-controlled material supply to the mould to which the connector portion of the pouch is connected.

In one embodiment, at least one aperture may be formed in the housing, the at least one aperture being configured as a fluid outlet for discharging fluid from the chamber, fluid being introduced into the chamber through the proximal end of the housing. A valve may be provided for controlling discharge of fluid from the chamber within the housing.

The application of a fluid around the pouch reduces the risk that an exothermic reaction occurs in the case where the resin is over-heated. In addition, a circulation of fluid around the pouch can be used to cool down the resin in case an exothermic reaction is detected.

In one embodiment, two apertures are formed in the housing where one of the apertures forms a fluid inlet configured for introducing fluid into the chamber within the housing and the other aperture forms a fluid outlet for discharging fluid from the chamber within the housing.

In this way, once the pouch has been assembled within the housing and connected to or through the injector head, fluid can be introduced into the housing to fill an space remaining in the chamber between the pouch and the internal wall of the housing. The introduction of such fluid ensures that the pressure applied by movement of the piston towards the proximal end of the housing is applied to the pouch by means of the fluid and not directly by the piston. This has the advantage of being able to precisely-control the quantity of material supplied from the connector portion of the pouch in accordance with the pressure applied by the piston.

The location of inlet and outlet are such that they do not interfere with the operation of the piston, and, in one embodiment, the inlet and outlet are located adjacent one another within the housing, and in another embodiment, the inlet and outlet are located diametrically opposed from one other within the housing.

In one embodiment, the fluid inlet and fluid outlet are configured to be connected to a fluid reservoir. In another embodiment, the fluid reservoir includes a pump for pumping fluid into the housing through the fluid inlet. In this embodiment, fluid can be drained from the housing through the fluid outlet. The fluid inlet and fluid outlet may each include valves for sealing a predetermined amount of fluid in the housing.

The fluid is an incompressible fluid. This has the advantage that the fluid does not compress when pressure is applied to the chamber by the piston and the applied pressure is transferred therethrough to the pouch to provide the material supply.

In one embodiment, the fluid comprises water. This has the advantage of being readily available and is effectively inert with respect to the resin material within the pouch.

In another embodiment, the water is pre-heated water, and, has the advantage of heating the resin material in the pouch to a temperature suitable for forming the resin supply for injection moulding.

In an embodiment, the assembly further comprises a bubble degasser configured for degassing the fluid within the chamber. It is important that there is no gas or air in the fluid in the chamber as the transfer of pressure through the fluid needs to be hydrostatic and must not include any compression of gas or air which would reduce the accuracy of flow control for the material supply. The bubble degasser may be mounted in the injector head or in a wall of the housing and is configured to be in fluid communication with the chamber.

A pressure sensor is provided for sensing the pressure of the fluid within the chamber. By accurate measurement of the pressure applied to the fluid, it is possible to provide precisely-controlled flow for the material supply from the pouch. Changes in the pressure applied by the piston head to the fluid result in associated changes in flow rate of the material supply from the pouch. The pressure sensor may be mounted in the piston, the injector head or a side wall of the housing, and, is configured for sensing the pressure within the chamber.

In an embodiment, a heater may be configured to be located on an external wall of the housing for heating the fluid within the chamber, heat being transferred from the heater and housing to the fluid and then to the pouch located in the chamber.

By heating the fluid in the chamber, the material in the pouch is also heated to a temperature suitable for flow of the material to the mould.

By using a stepper motor may be used to control the movement of the piston, accurate control of the pressure within the chamber caused by the movement of the piston can be obtained.

In accordance with yet another aspect of the present invention, there is provided an injection moulding system comprising:

a mould; and an injector assembly as described above connected to supply injectable material to the mould.

The injection moulding system may comprise a resin transfer moulding system or a same qualified resin transfer moulding system. In either case, the injectable material comprises a resin material.

In accordance with a further aspect of the present invention, there is provided a method for injecting material into a mould using an injector assembly described above, the method comprising the steps of:

a) connecting a pouch containing material to be injected to the injector head;

b) attaching the injector head to the injector assembly with the pouch within the chamber of the housing;

c) connecting the pouch to the mould;

d) compressing the pouch to dispense material from the pouch for the mould; and e) sensing hydrostatic pressure within the chamber.

By using the pouch of the present invention, it is possible to simply the injection moulding method by providing a quick and simple way of providing a material supply for injection moulding without the disadvantages of conventional injection moulding systems.

The method may further comprise the steps of:

filling the chamber with a predetermined amount of fluid; and pressurising the fluid in the chamber so as to transfer pressure from the fluid to the pouch to dispense the material therefrom.

In addition, the method further comprises the steps of:
degassing the fluid in the chamber; and
wherein step e) comprises measuring the pressure applied to the fluid in the chamber.

By degassing the fluid in the housing, the pressure applied to the pouch by the surrounding fluid is controlled as there is no gas present which will compress at a different rate to that of the fluid to affect the transfer of applied pressure and hence flow control for the material supply.

Step e) comprises measuring hydrostatic pressure of the fluid in the chamber, and, step d) comprises using the hydrostatic pressure within the chamber to compress the pouch to dispense the material for the mould.

In accordance with the present invention, the method further comprises the step of controlling material flow from the pouch in accordance with the applied hydrostatic pressure.

In this way, precise material flow control can be obtained as the hydrostatic pressure within the chamber is an indication of the position of a piston within the housing, and hence volume of the chamber. The volume of the chamber, and as a result, the pressure therein, is controlled by the movement of a piston within the housing. The movement of the piston is itself precisely controlled using, for example, a stepper motor to pressurise the fluid in the chamber thereby creating the hydrostatic pressure for compression of the pouch. Movement of the piston is measured and controlled to ensure precise increases in the measured hydrostatic pressure to provide the precise material flow control. Naturally, measurement of the position of the piston within the housing determine the pressure applied to the fluid, and, measurement of the hydrostatic pressure applied to the pouch provides control of material flow therefrom.

The method further comprises the steps of:
f) when a desired amount of material has been dispensed from the pouch, disconnecting the injector head from the mould;
g) removing the injector head from the housing;
h) removing the pouch from the injector assembly; and
i) discarding the pouch.

In this way, all residual resin is retained in the pouch and can simply be discarded resulting in no cleaning of the housing or piston head with solvents such as acetone, with minimal cleaning of the injector head depending on how the pouch is attached thereto. If the connector portion of the pouch is connected directly to the injector head, it will be necessary for some cleaning of the injector head.

However, if the injector head is split as described above and the connector portion extends through an aperture in the injector head, no cleaning will be required. Naturally, any connecting tubing or hoses used can either be cleaned or replaced but this is relative minor compared to having to clean the housing and piston of the injector assembly.

In addition, safety is improved as there is no need to transfer hot material from a heating stage to the injector housing. If the material is to be transferred from a heating stage, this is done in the pouch. Safety is also improved because the pouch is surrounded by a fluid that can dissipate heat where the material is a resin material presenting a risk of an exothermic reaction.

BRIEF DESCRIPTION OF THE DRAWINGS

For a better understanding of the present invention, reference will now be made, by way of example, to the accompanying drawings in which:—

FIG. 7 is similar to FIG. 1 but illustrates a fourth embodiment of an injector assembly in accordance with the present invention.

DESCRIPTION OF THE INVENTION

Figure 2:
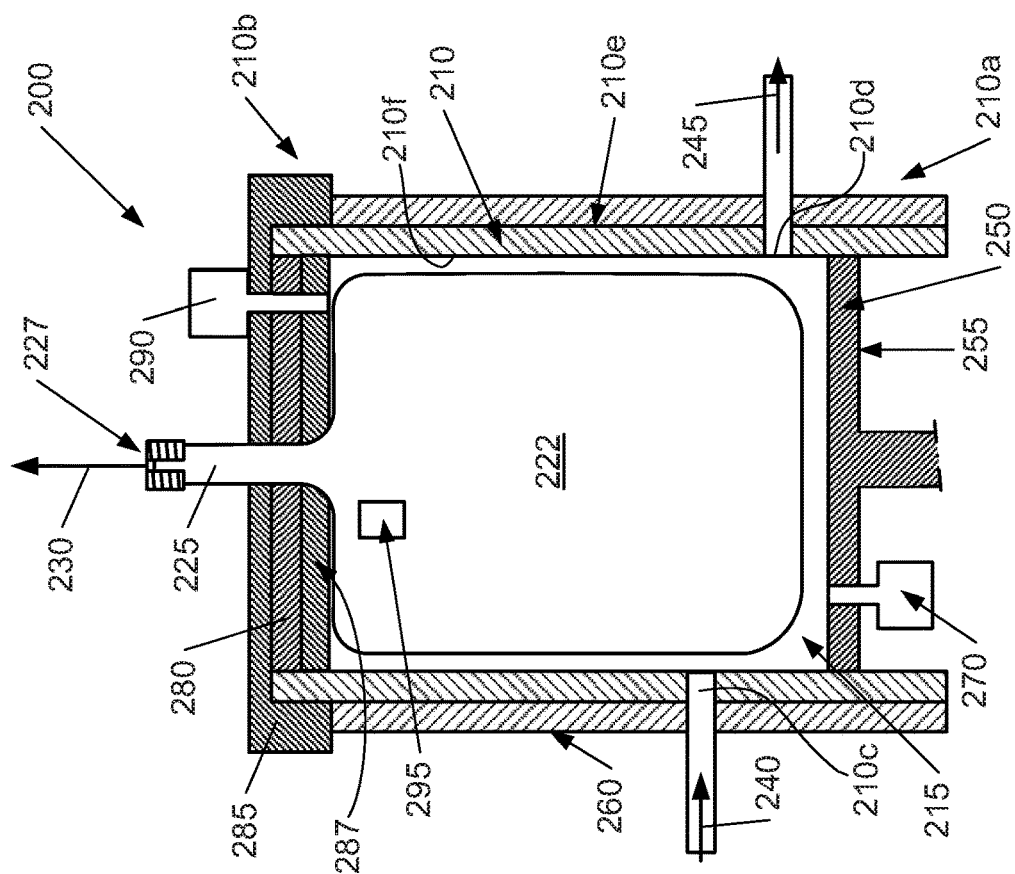
FIG. 2 is similar to FIG. 1 but illustrates a second embodiment of an injector assembly in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The term "pouch" as used herein refers to a pre-prepared resin reservoir in which the resin has been degassed ready for use.

The terms "cartridge", "housing" or "cylinder" as used herein refer to an elongate cylindrical piston housing which may form a reservoir for an inert fluid and into which the pouch is located for heating prior to providing a resin supply for injection. The term "cartridge" tends to indicate a removable and refillable component, and, the terms "housing" and "cylinder" are more general and each term is also intended to include a removable and refillable component.

The term "piston" as used herein refers to a part moveably mounted within the housing. The piston seals one end of the housing. Movement of the piston within the housing increases or decreases the pressure within the cartridge, housing or cylinder.

The term "injector head" as used herein refers to a part removably mounted on the housing at an end remote from the piston. The injector head mounts the pouch within the housing.

The term "injection assembly" as used herein refers to an assembly of the cartridge, housing or cylinder with the piston at one end and the injector head at the other end connected to the pouch.

The term "injectable material" as used herein refers to a material which can be used for moulding, in particular, but not exclusively, a resin which can be used for both RTM and SQRTM processes.

In accordance with embodiments of the present invention, resin is pre-loaded and sealed in a compressible pouch, the pouch being stored at a suitable temperature to prevent the premature activation of the resin. Each pouch includes a radio frequency identification (RFID) tag which stores information relating to the properties of the resin, the manufacture date of the resin, the storage date etc. The pouch is shaped to have a body portion forming a reservoir for the resin material to be injected and a connector portion which is configured to be connected to an injector at an outlet thereof, the connector portion being in fluid communication with the body portion.

The pouch is mountable within the injector which comprises a cylinder or housing having a removable injector head to which the pouch can be mounted at one end. A motor-operated piston arrangement at the other end of the cylinder or housing is used to pressurise the interior of the cylinder when fully assembled. A stepper motor may be used to move the piston. Water is provided in the cylinder to surround the pouch. The piston arrangement pressurises the interior of the cylinder to apply pressure to the water in the cylinder, which, in turn, due to hydrostatic pressure, pressurises the resin material in the pouch to provide a resin supply through the outlet of the connector portion and tubing connecting the connector portion to a mould. After use, the tubing is disconnected from the mould, the injector head removed and the pouch is removed and discarded with the connected tubing, and, there is no need to clean the inside of the cylinder or housing or other components of the injector assembly.

The addition of water creates a uniform hydrostatic pressure around the pouch preventing it from tearing due to unevenly distributed pressure. In addition, water allows heat to be transferred to the pouch from an external heater, a heated piston, a heated injector head of a combination of the external heater, the heated piston and the heated injector head. As hydrostatic pressure is used to compress the pouch, the pouch can be light and made of a low-cost material. Furthermore, the use of water provides precise flow control for the resin supply with respect to volume and time, that is, in $cm^3/min$, by the controlled displacement of the piston. The presence of air in the chamber of the housing would severely affect the precise flow control of the resin supply as the air would compress more readily than the water and it would not be possible to determined the exact flow for a given applied pressure. The water in the cylinder is degassed to remove all air bubbles so that the transfer of pressure from the piston to the pouch can accurately be controlled.

The pouch preferably has a diameter which is smaller than the diameter of the internal wall of the housing to facilitate the insertion of the pouch. Once the pouch is fully inserted and the water added (either before or after the insertion of the pouch), the injector head is fixed to proximal end of the housing by means of a threaded ring which engages with a complementary thread on the external wall of the housing or by a quarter-turn system which locks the injector head in place on the housing.

The assembled cartridge assembly is connected to the mould by means of a tube connected to the injector head, and, in particular, to the connector portion of the pouch. A typical injection pressure is 7 bar (700 kPa) and may vary between 2 bar (200 kPa) and 30 bar (3 MPa) depending on the particular cartridge assembly. In effect, the present invention provides flow controlled injection at high pressures as indicated above.

The present invention is intended for use in both RTM and SQRTM injector systems to provide consistent and total process control for the resins therefor. The flow rate provided to moulds using the injector systems is precision-controlled with flow rates from 1 $cm^3/min$ to 1500 $cm^3/min$ at injection pressures up to 27 bar (2.7 MPa). Temperature control and monitoring is provided up to 180° C. (but in some implementations, it may be possible to operate at temperatures up to 280° C.). If flow control is not essential, pneumatic actuation may be used to apply pressure to the pouch as an alternative to having a motor-operated piston arrangement, for example, using a stepper motor.

Figure 1:
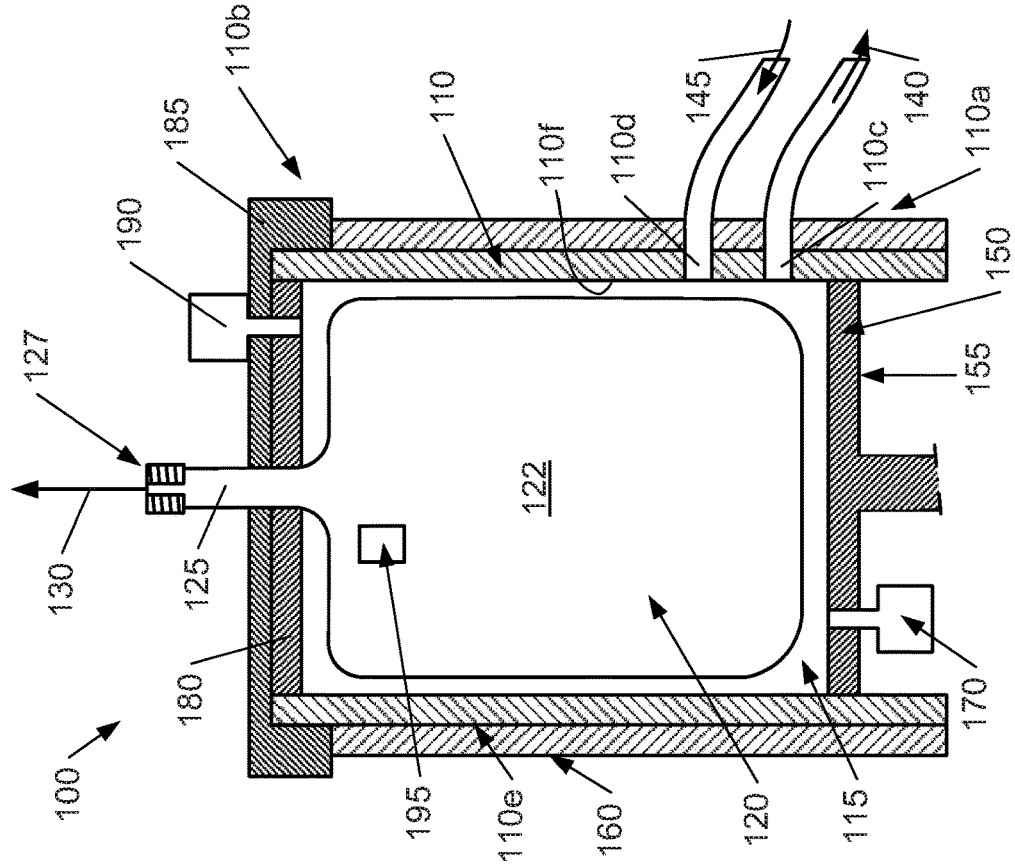
FIG. 1 illustrates a schematic cross-sectioned view through one embodiment of an injector assembly for use in RTM/SQRTM injectors in accordance with the present invention.

FIG. 1 is a schematic cross-sectioned view of an assembled injector assembly 100 in accordance with one embodiment of the present invention. The injector assembly 100 comprises a housing 110 having a distal end 110a and a proximal end 110b with a chamber 115 having an adjustable volume defined between the distal end and the proximal ends 110a, 110b as shown. The housing 110 is closed by a piston 150 at the distal end 110a and a removable injector head 180 at the proximal end 110b as will be described in more detail below.

It will readily be understood that the terms "distal" and "proximal" relate to the ends of the housing with respect to the drawings and that these terms can be interchanged in accordance with the orientation of the cartridge and its housing.

A pouch 120 is mountable within the chamber 115 of the housing 110. The pouch 120 comprises a body portion 122 and a connector portion 125 which is in fluid communication with the interior of the body portion 122. The connector portion 125 has an outlet portion 127 through which a resin supply 130 is provided to a mould (not shown) from the pouch 120. The connector portion 125 is also configured for being connected to the injector head 180 located at the proximal end 110b of the housing 110 for retaining the pouch 120 in place within the injector assembly 100. The connector portion 125 may be connected directly to the injector head 180 or may be only supported by the injector head with tubing being connected directly to the mould by means of a valve (not shown).

Apertures 110c, 110d are provided in one wall of the housing 110 for connection to a water supply (not shown) with water entering the housing 110, as shown by arrow 145, and exiting from the housing 110, as shown by arrow 140. Apertures 110c, 110d comprise a respective inlet and outlet for the water.

The water supply may comprise a reservoir which feeds the housing 110 (arrow 145) during a fill phase and receives the water returned from the housing 110 (arrow 140) during an empty phase. A pump may be provided for filling the chamber 115 with water from the reservoir and for emptying water from the chamber into the reservoir. In an alternative embodiment, the water supply may comprise any other suitable means for filling the housing 110 of the injector assembly 100 with water around the pouch 120, for example, no inlet or outlet is provided and water is introduced and removed through the open proximal end 110b of the housing. In another embodiment, an outlet may be provided with a valve for emptying the water introduced through the open proximal end 110b.

Although a water supply is described, a supply of any other suitable inert fluid may be used. By the term "inert" is meant not reactive to the resin within the pouch. Other fluids capable of applying a determinable hydrostatic pressure to the pouch may be used.

The piston 150 at the distal end 110a of the housing 110 is configured for adjusting, that is, reducing, the volume of the chamber 115 of the housing 110 by movement in the direction of arrow 155. As the volume in the chamber 115 is decreased, the water therein transfers pressure to the pouch 120 thereby compressing the body portion 122 thereof to cause resin to flow from the body portion 122 through the connector portion 125 and outlet 127 to provide the resin supply 130 to the mould (not shown).

The housing 110 and the piston 150, when the injector head 180 is attached to the housing, define a sealed piston arrangement in which the pouch 120 is located.

The piston 150 may be operated by any suitable motor (not shown) under the control of a system controller (also not shown). In one embodiment, the motor comprises an electric motor, and, in another embodiment, a pneumatic or hydraulic actuator may be used to move the piston 150 in the direction of arrow 155. The piston 150 may be heated to transfer heat to the water and then to the resin material within the pouch 120.

The piston 150 may comprise a seal configuration which enables high pressure to be maintained within the chamber 115 when the piston 150 is moved in the direction indicated by arrow 155. In effect, the piston 150 forms a moveable end wall at the distal end 110a of the housing 110 and the pressure sensor 170 is mounted therein. The seal configuration is provided between the piston 150 and the internal wall 110f of the housing 110 so that water does not escape between the piston and the internal wall of the housing.

As the chamber 115 only contains an inert fluid, such as, water, there is no need to clean the housing after each use. Cleaning would only be required if some of the resin material escaped from the pouch. By not having to clean the seal configuration after each use, the life thereof is increased as a major cause of degradation of the seals is the requirement for cleaning.

An external heater 160, for example, an electrical heater, may be provided along external wall 110e of the housing 110 to heat the wall of the housing and to ensure that the water in the chamber 115 thereof is at a suitable temperature enabling the resin to flow freely from the body portion 122 of the pouch 120 through the connector portion 125 and outlet 127 to form the resin supply 130 when the pouch is compressed by the surrounding water in the chamber 115. The external heater 160 may be provided in addition to, or as an alternative to, heating the piston 150.

In one embodiment, the water is heated to around 80° C. so that it is at a lower temperature than the injection temperature. This lower temperature provides cooling for the pouch 120 so that the resin material therein remains safe, that is, does not reach its exothermic reaction temperature.

A pressure sensor 170 is provided in the piston 150 to measure the pressure exerted on the water within the chamber 115 of the housing 110 due to movement of the piston in the direction of arrow 155, thereby providing an indication of the pressure applied to the pouch 120. However, the pressure sensor 170 may be mounted in any other suitable location in the injection assembly, for example, the injector head 180 or through the external wall 110e of the housing 110.

The injector head 180 mounted to the proximal end 110b of the housing 110 is configured to locate the connector portion 125 of the pouch 120 with respect to the housing 110. The injector head 180 seals the proximal end 110b of the housing 110 so that water within the chamber 115 does not escape between the injector head 180 and an internal wall 110f of the housing 110 or around the connector portion 125 of the pouch 120 and the injector head 180 when pressure is applied by the piston head 150.

A locking mechanism 185 is provided over the injector head 180 to lock it in position. The locking mechanism 185 may comprise a ring which is configured to engage with the proximal end of wall 110e and a surface of the injector head 180.

Alternatively, the injector head 180 may be shaped to include the locking mechanism by having a rim portion (not shown) which is configured to project over the external wall 110e of the housing 110 when mounted thereon, the rim having an internal thread which is configured to engage with an external thread formed on the external wall of the housing 110.

A bubble degasser 190 is provided in the injector head 180 to remove bubbles within water in the chamber 115 so that the pressure applied by the piston 150 does not compress air bubbles within the water reducing the pressure applied to the pouch 120. This removal of air bubbles ensures that the measured pressure is the pressure that is applied to the pouch or is related thereto in a known relationship.

An RFID tag 195 is provided on the pouch 120 so that the properties etc. of the resin therein can readily be determined after filling of the pouch. Such tags may be used to validate that the pouch is an original and not a copy, or one which has been refilled. As an alternative to RFID tags, other sorts of machine-readable codes may be used, for example, barcodes, QR codes and the like.

In one embodiment, the injector head 180 may include an RFID reader (not shown) which is configured to read RFID tag 195 on the pouch 120 so that when the pouch is connected to the injector head, it will only operate when the RFID tag has been validated as being an authentic pouch.

The body portion 122 of the pouch 120 can be made from any suitable flexible material which can be compressed to dispense the resin therein by way of the fluid communication with the connector end 127, and through which the resin can be heated by surrounding water. For example, a synthetic polymer, such as, polyethylene (low density, medium density, high density or a combination thereof), polypropylene, polyvinyl chloride (PVC), polyester, nylon, polyethylene terephthalate (PET) and a combination thereof may be used for the body portion 122. Elastomeric materials may also be used for the body portion 122, such as, polyurethane, natural rubber, polybutadiene, neoprene and silicone. Similar or different materials may be used for the connector portion 125 which needs to be more rigid than the body portion as it does not need to be compressed. In fact, compression of the connector portion 125 would restrict flow of the resin supply from the body portion 122 to the mould (not shown). Naturally, the material from which the pouch 120 is made is not reactive with the resin inside it or with the water (or the other inert fluid) in the chamber 115 surrounding it. The connector portion 125 may comprise a more rigid material which does not compress and which can easily be mounted to the injector head 180 as described in more detail below.

FIG. 2 is similar to FIG. 1 but with a different water flow configuration and a different injector head. In FIG. 2, injector assembly 200 comprises a housing 210 having an adjustable volume chamber 215. The housing 210 has a distal portion 210a and a proximal portion 210b. A pouch 220 is mounted within the chamber 215 of the housing 210 with its connector portion 225 extending through an injector head 280 positioned at the proximal end 210b of the housing 210. The connector end 225 is in fluid communication with body portion 222 of the pouch 220 and has an outlet 227 configured to be connected to an injector head 280 and to provide a resin supply 230 thereto.

In this embodiment, the injector head 280 includes a heater portion 287 which makes contact with the proximal end of the pouch 222 and the water in the chamber 215 to heat the resin to a temperature suitable for injection moulding, for example, 95° C. to 120° C. In this way, not all the resin material is heated to the injection moulding temperature and only the portion nearest the injector head is heated to provide the resin supply 230.

Apertures 210c, 210d are provided in the housing 210 for connection to a water supply (not shown) providing water to the housing 210, as shown by arrow 240, with water being removed from the housing 210, as shown by arrow 245. Apertures 210c, 210d comprise a respective inlet and outlet for the water and are diametrically opposed in the housing 210 but at different distances with respect to the proximal end 210b of the housing 210. As described above, the water supply may comprise a reservoir which feeds the housing 210 (arrow 240) (fill phase) and receives the water drained from the housing 210 (arrow 245) (empty phase). A pump may be provided for one or more of the fill and empty phases.

A piston 250 mounted at the distal end 210a of the housing 210 is configured for changing the volume of the chamber 215 of the housing 210 by movement in the direction of arrow 255. As the volume of the chamber 215 is decreased, the water therein compresses the pouch 220 and resin passes through the connector portion 225 and outlet 227 to provide the resin supply 230 for the injector head 280 of the injector assembly 200.

As described with reference to FIG. 1, an external heater 260, for example, an electric heater, may be provided for the housing 210 to ensure that the water in the chamber 215 thereof is at a suitable temperature which enables the resin to flow freely from the body portion 222 of the pouch 220 through the connector portion 225 and outlet 227 to provide the supply of resin 230 when the pouch is compressed by the surrounding water in the chamber 215. Such an external heater 260 may be implemented in addition to, or alternative to, heating the piston 250, and, may be implemented as an addition to the heater portion 287 of the injector head 280. As described above, the water is heated to approximately 80° C. so that it is at a lower temperature than the injection temperature so that the pouch 220 can be cooled keeping the resin material therein remains safe.

A pressure sensor 270 is provided in the piston 250 to measure the pressure exerted on the water within the chamber 215 of the housing 210, thereby providing an indication of the pressure applied to the pouch 220. An injector head 280 is mounted at the proximal end 210b of the housing 210 and seals the end thereof so that water within the chamber 215 does not escape therethrough when pressure is applied by the piston 250 as it moves in the direction of arrow 255. As described above with reference to FIG. 1, the pressure sensor 270 may be mounted in any other suitable location in the injection assembly.

A bubble degasser 290 is provided in the injector head 280 to remove bubbles within the water in the chamber 215 so that the pressure applied by the piston 250 is not compressing air bubbles within the water and reducing the accuracy of flow control of the resin material from the pouch 220.

An RFID tag 295 is provided on the pouch 220 so that the properties etc. of the resin therein can readily be determined within the pouch. In addition, an RFID reader may be provided in the injector head so that the injector assembly will only operate with a pouch which is validated to be authentic.

A locking mechanism 285 is provided over the injector head 280 to lock it in position. The locking mechanism 285 may comprise a ring which is configured to engage with the proximal end of wall 210e and a surface of the injector head 280.

Alternatively, the injector head 280 may be shaped to include the locking mechanism by having a rim portion (not shown) which is configured to project over the external wall 210e of the housing 210 when mounted thereon, the rim having an internal thread which is configured to engage with an external thread formed on the external wall of the housing 210.

It will be readily understood that features described with reference to the cartridge 100 of FIG. 1 are equally applicable to the cartridge 200 of FIG. 2 and vice versa.

Figure 3:
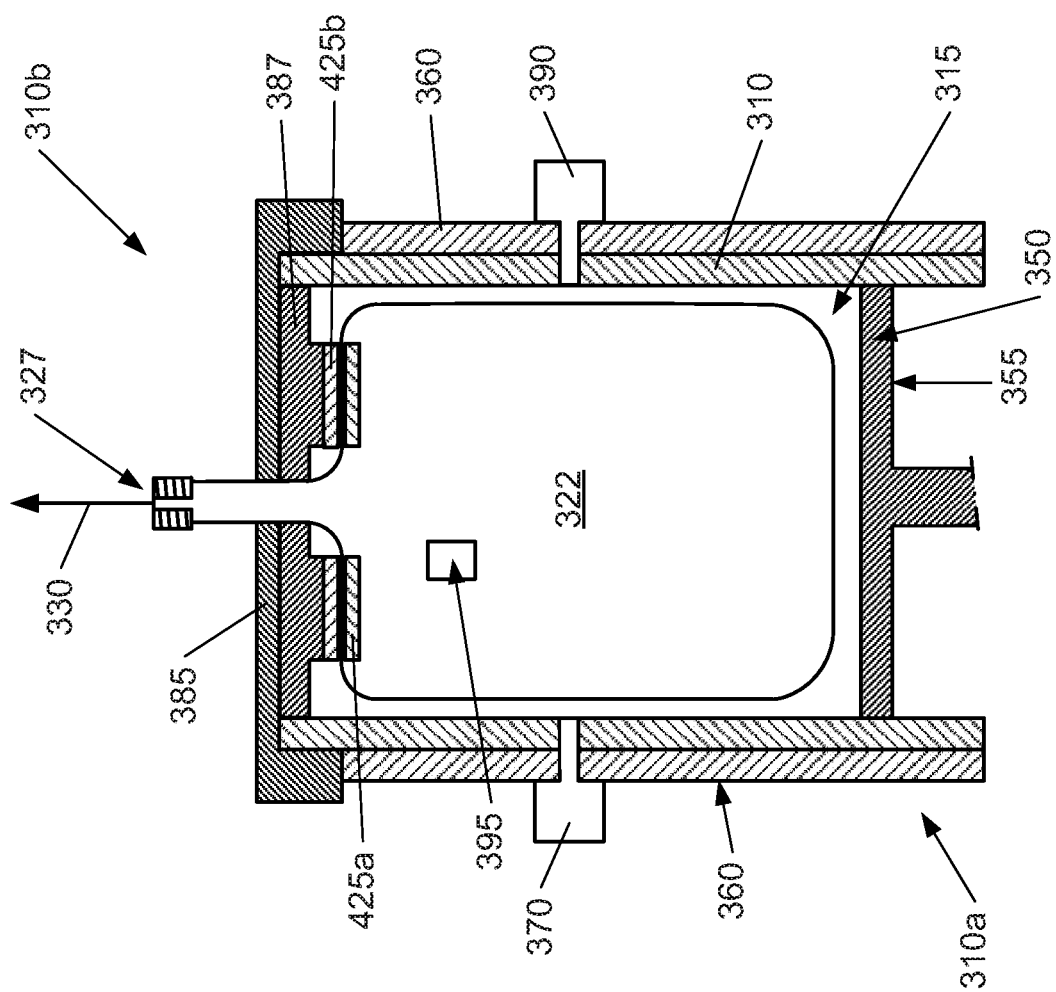
FIG. 3 is similar to FIGS. 1 and 2 but illustrates a third embodiment of an injector assembly in accordance with the present invention.

FIG. 3 illustrates a further embodiment of an injector assembly 300 in accordance with the present invention. Injector assembly 300 comprises a housing 310 having an adjustable volume chamber 315. The housing 310 has a distal portion 310a and a proximal portion 310b. A pouch 320 is mounted within the chamber 315 of the housing 310 with its connector portion 325 extending through an injector head 380 positioned at the proximal end 310b of the housing 310 as described above with reference to FIGS. 1 and 2. The connector end 325 is in fluid communication with body portion 322 of the pouch 320 and has an outlet 327 configured to be connected to an injector head 380 and to provide a resin supply 330 thereto.

In this embodiment, the pouch 320 includes a connector portion 425 (FIGS. 6a and 6b) comprising a first portion 425a mounted to an interior surface of the body portion 322 of the pouch 320, and a second portion 425b mounted to an exterior surface of the body portion of the pouch as will be described in more detail with reference to FIGS. 6a and 6b. The second portion is connected to the first portion to hold the body portion between the first and second portions.

In this embodiment, the injector head 380 is heated with shaped heater portion 387 which makes contact with connector portion 425 of the pouch 322 to heat the resin to a temperature suitable for injection moulding, for example, 95° C. to 120° C. In this embodiment, the shaped heater portion 387 is configured to make contact with the connector portion 425. In this way, not all the resin material is heated to the injection moulding temperature and only the portion nearest the injector head is heated to provide the resin supply 330. Water heating may also be achieved using the shaped heater portion 387 as described with reference to FIG. 2 above.

The injector head 380 of this embodiment, includes a central threaded portion which extends therethrough. An external portion of the connector portion 425 of the pouch 320 has a complementary threaded portion as described in more detail with reference to FIGS. 6a and 6b, which enables the pouch 320 to be connected to the injector head 380 by way of the central threaded portion in the injector head. Although the external portion of the connector portion 425 of the pouch 320 is threaded, it will be appreciated that an internal portion of the connector portion may also be threaded to receive a connecting tube which connects the injector head to the mould at a mould end of the connecting tube. Preferably, a valve is located at the mould to which the connecting tube is attached during the moulding and curing process so that, at the end of the curing process, the connecting tube can simply be disconnected from the valve and discarded with the pouch.

Moreover, the injector head 380 includes an integral locking mechanism 385 to attach the injector head to the proximal end 310b of the housing 310 in a similar way as described above with reference to FIGS. 1 and 2.

A piston 350 mounted at the distal end 330a of the housing 310 is configured for changing the volume of the chamber 315 of the housing 310 by movement in the direction of arrow 355. As the volume of the chamber 315 is decreased, the water therein compresses the pouch 320 and resin passes through the connector portion 425 and outlet 327 to provide the resin supply 330 for the injector head 380 of the injector assembly 300.

In this embodiment, water is added to the chamber 315 of the housing 310, preferably before the pouch 320, connected to the heated injector head 380 by the connector 425, is inserted into the chamber 315 as there are no inlets through which water can be introduced after the headed injector head has been mounted to the proximal end 310b of the housing 310. Similarly, no outlets through which water can be drained are provided.

However, in other embodiments, inlets and outlets can be provided in a similar way to the embodiments of FIGS. 1 and 2. In another embodiment, water is introduced into the open proximal end of the housing, and, an outlet having an associated valve may be located at a suitable position in the wall of the housing 310 to enable the majority of water to be drained from the chamber 315 under the force of gravity.

As described with reference to FIGS. 1 and 2, an external heater 360, for example, an electric heater, may be provided for the housing 310 to ensure that the water in the chamber 315 thereof is at a suitable temperature which enables the resin to flow freely from the body portion 322 of the pouch 320 through the connector portion 425 and outlet 327 to provide the supply of resin 330 when the pouch is compressed by the surrounding water in the chamber 315. Such an external heater 360 may be implemented in addition to the heater portion 387 of the injector head 380. As described above, the water is heated to approximately 80° C. so that it is at a lower temperature than the injection temperature so that the pouch 320 can be cooled keeping the resin material therein remains safe.

A pressure sensor 370 and a bubble degasser 390 are provided in the wall of the housing 310 to measure the pressure exerted on the water within the chamber 315 of the housing 310 and to degas the water in the chamber respectively. As described above, the pressure sensor 370 provides an indication of the pressure applied to the pouch 320, and the bubble degasser 390 removes bubbles from the water to ensure that pressure is only applied to the water by the movement of the piston 350 and then to the pouch 320.

As described above, injector head 380 is mounted at the proximal end 310b of the housing 310 and seals the end thereof so that water within the chamber 315 does not escape therethrough when pressure is applied by the piston 350 as it moves in the direction of arrow 355.

A locking mechanism 385 is provided over the injector head 380 to lock it in position. The locking mechanism 385 may comprise a ring which is configured to engage with the proximal end of wall 310e and a surface of the injector head 380.

Alternatively, the injector head 380 may be shaped to include the locking mechanism by having a rim portion (not shown) which is configured to project over the external wall 310e of the housing 310 when mounted thereon, the rim having an internal thread which is configured to engage with an external thread formed on the external wall of the housing 310.

An RFID tag 395 is provided on the pouch 320 so that the properties etc. of the resin therein can readily be determined within the pouch as described above. In addition, an RFID reader may be provided in the injector head so that the injector assembly will only operate with a pouch which is validated to be authentic.

Whilst particular water flow configurations have been described with reference to FIGS. 1 to 3, other water flow configurations are possible. For example, the inlet may be at a higher position in the wall of the housing with respect to the outlet, and, may be on the same side of the housing or on a different side.

Although the housing has been described as being cylindrical, the housing can be any suitable shape which allows a piston to be located at a distal end thereof and an injector head to be located at a proximal end thereof whilst meeting the requirements for sealing with the housing to prevent the egress of water when the housing is filled with water and pressurised.

In addition, it will be appreciated that the body portions 122, 222, 322 of the pouches 120, 220, 320 shown FIGS. 1 to 3 may be sized to have a volume which is nearer to the normal volume of the chamber 115, 215, 315, that is, before the piston 150, 250, 350 compresses the chamber, than is shown and may substantially fill the chamber 115, 215, 315. However, this is not a limitation and the pouches may have difference sizes.

Injector heads 180, 280, 380 will be described in more detail with reference to FIGS. 4 and 5. Whilst injector head 180 will be described in more detail with reference to FIG. 1, it is to be understood that injector head 280 of FIG. 2 is effectively identical, and the injector head 380 of FIG. 3 effectively has the same features although it is heated and is shaped to contact the pouch as will be described with reference to FIGS. 6a and 6b.

Figure 4:
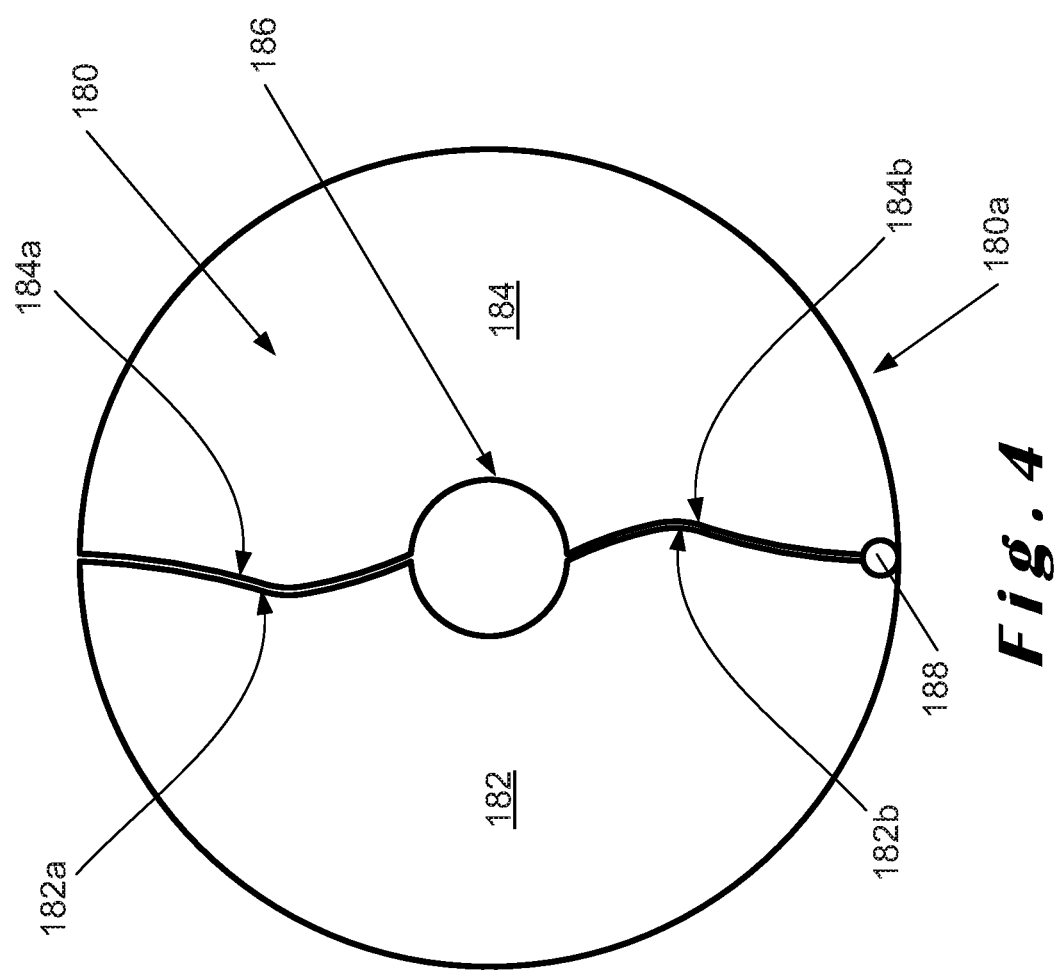
FIG. 4 illustrates an injector head for the injection assembly in accordance with the present invention in its closed position.
Figure 5:
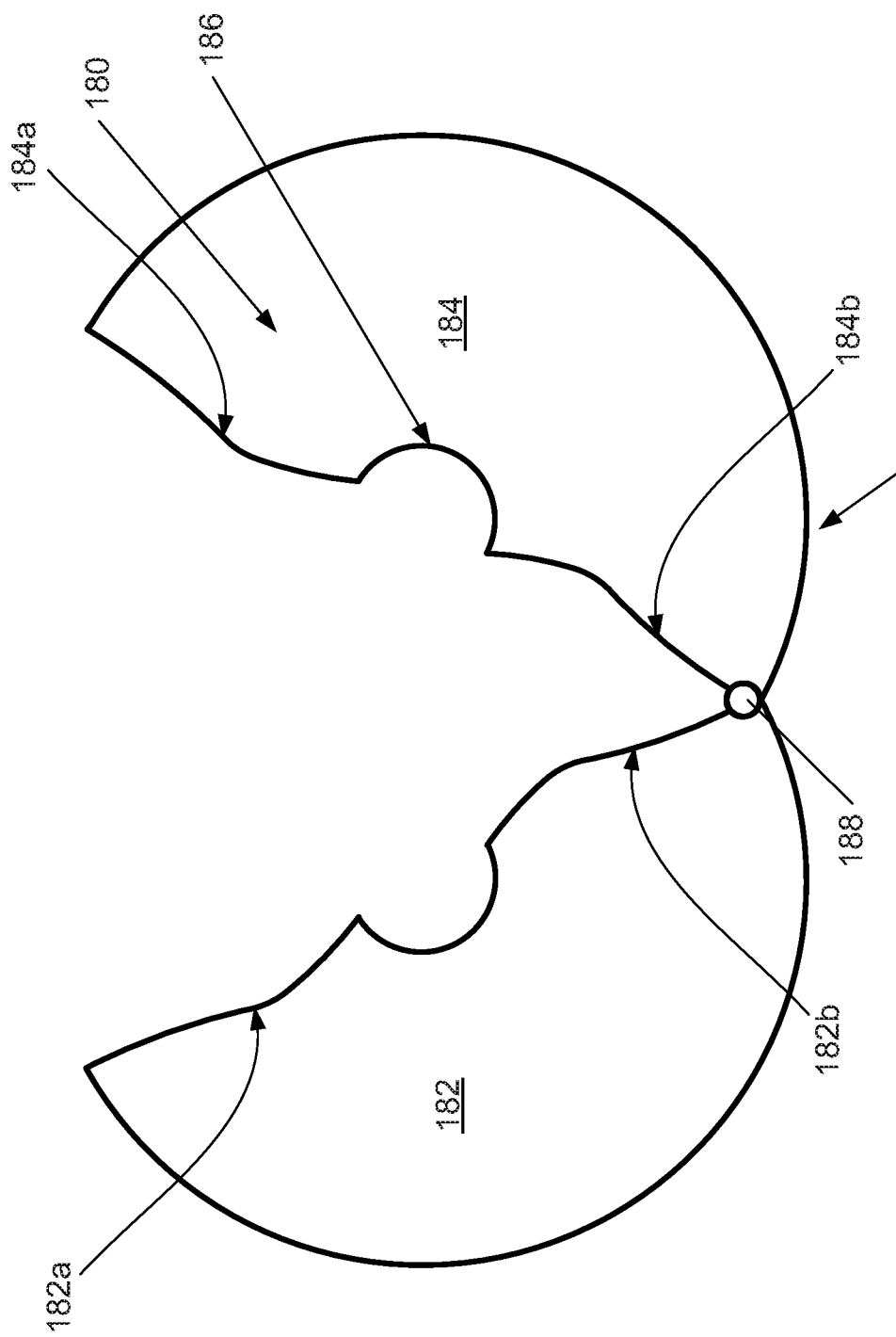
FIG. 5 illustrates the injector head of FIG. 4 in its open position.

FIGS. 4 and 5 respectively illustrate injector head 180 in the closed and open positions but without the bubble degasser 195. The injector head 180 comprises a first portion 182 and a second portion 184 which define a central aperture 186 through which the connector portion 125 and outlet 127 of the pouch 120 extends for connection to the injector head (not shown) for the delivery the resin supply 130 thereto. The first and second portions 182, 184 are hingedly connected to one another at a pivot point 188, and, can be moved from a closed position as shown in FIG. 4 to an open position as shown in FIG. 5. In the open position, the connector portion 125 can be located in the central aperture 186 prior to the first and second portions 182, 184 being moved to the closed position. In the closed position, the injector head 180 is configured for being fixed to the proximal end 110b of the housing 110.

Naturally, the first and second portions 182, 184 include means for sealing the two portions together (not shown) around the connector portion 125 of the pouch 120 to prevent the egress of water through connecting portions 182a, 182b and 184a, 184b when fully assembled in the injector assembly 100. Means for sealing are also provided around circumference 180a of the injector head 180 to prevent the egress of water between the injector head and the internal wall 110f of the proximal end 110b of the housing with which it engages.

As described above, the connection between the injector head 180 and the housing 110 (or 210) may be a threaded connection with the injector head 180 having an external thread around its circumference and the inside of the housing having a complementary internal thread. Although not shown, the injector head 180 may have a rim portion which carries an internal thread for engagement with an external thread formed on the wall of the housing 110 (or 210 or 310).

Figure 6A:
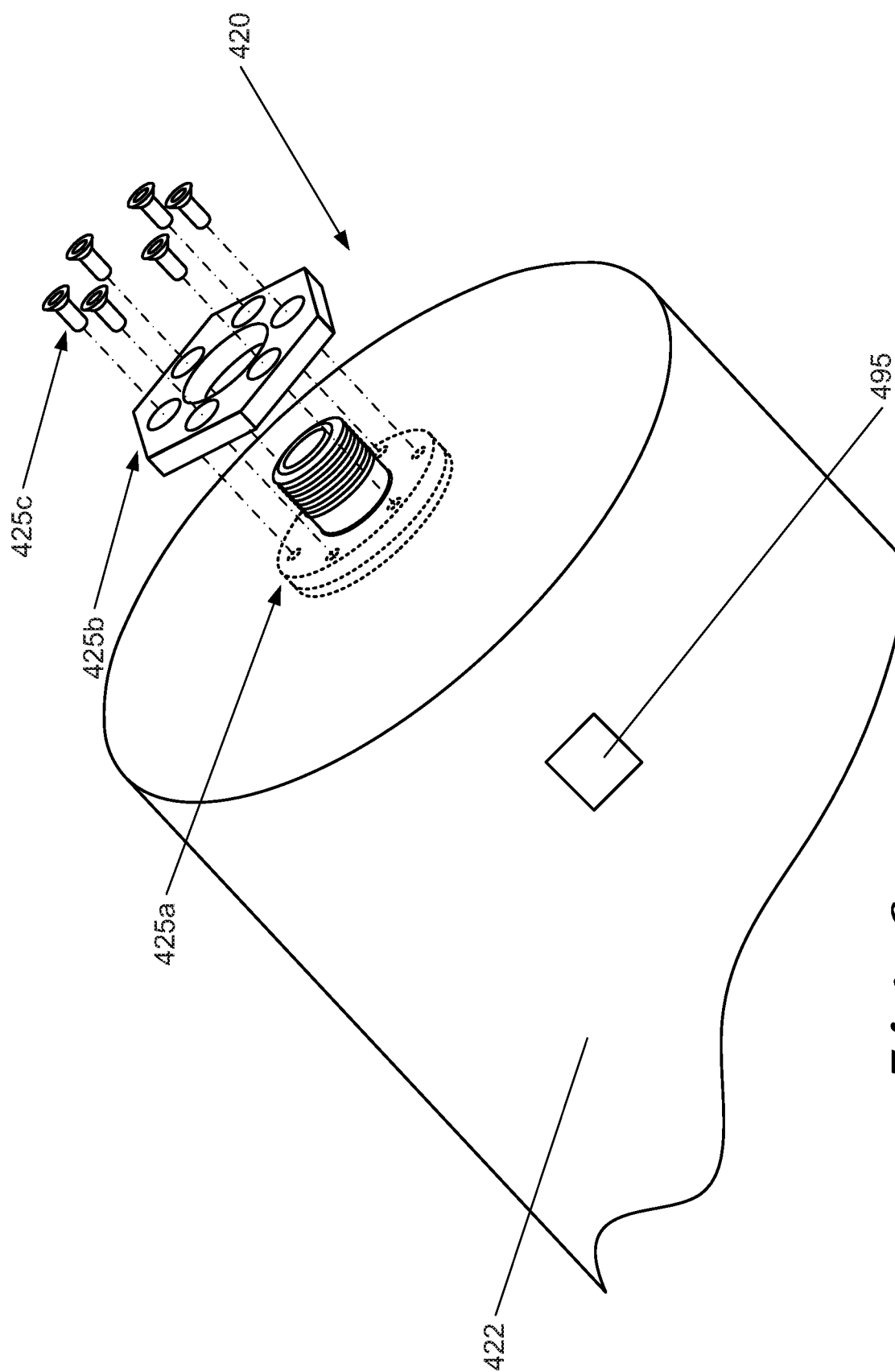
FIGS. 6a and 6b illustrate a connector for a pouch in accordance with the present invention.
Figure 6B:
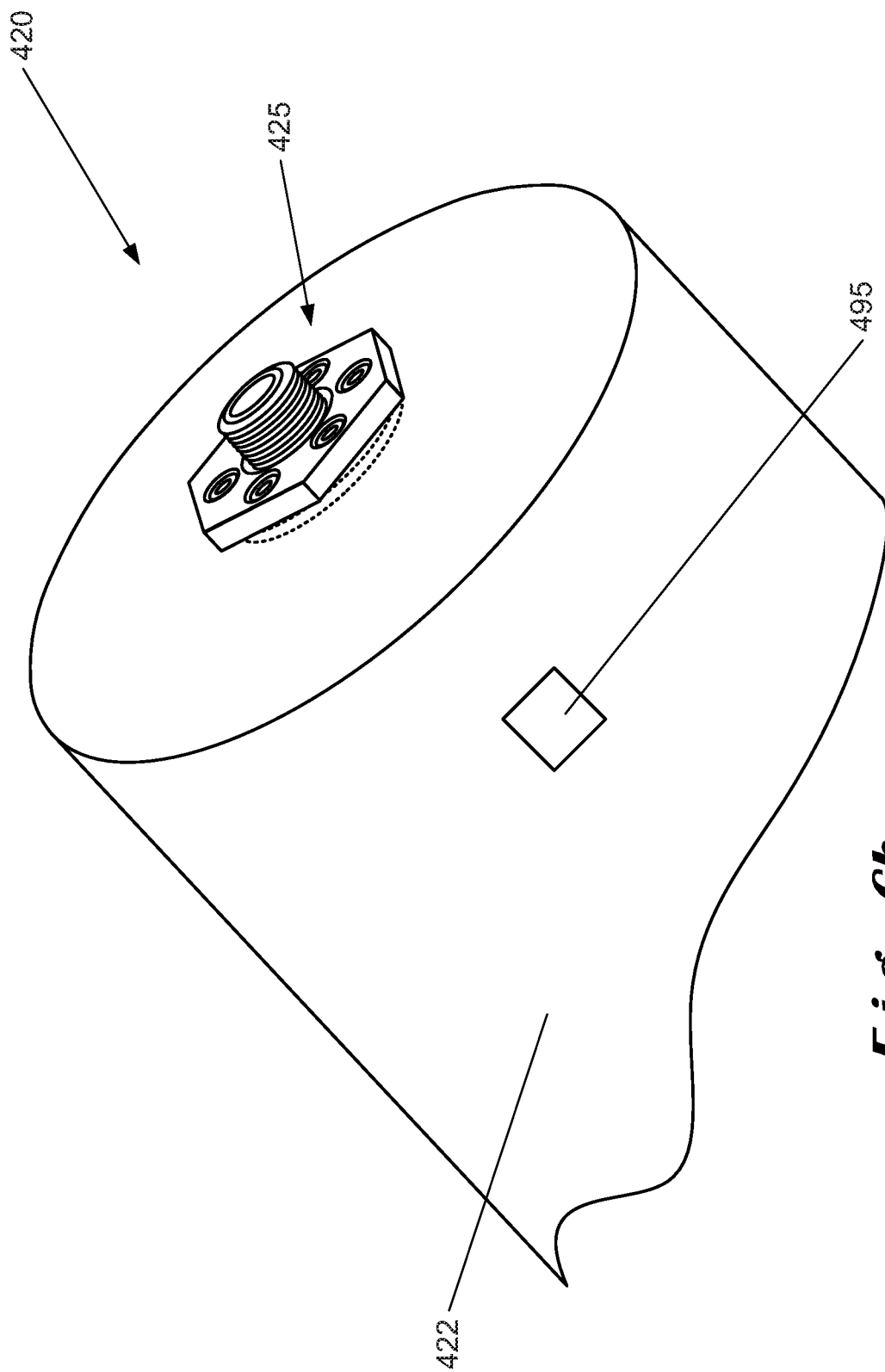

FIGS. 6a and 6b illustrate another embodiment of a pouch 420 which has a heat-conductive connector portion 425 for better heat transfer between a heated injector head and resin material in the pouch. The pouch 420 comprises a body portion 422 which forms a reservoir for resin material, and, the connector portion 425 has a first portion 425a within the body portion 422 and a second portion 425b outside the body portion 422, the first and second portions being connected together by means of screws 425c. An RFID tag 495 is provided on the body portion 422 of the pouch 420. The pouch 420 is suitable for use with the embodiment of FIG. 3 where the shaped heater portion 387 of the injector head 380 can make thermal contact with the heat-conductive portion connector portion 425.

The use of the pouch 120 will be described with reference to FIG. 1. The use of the pouch 220 of FIG. 2 is identical and will not be described again with reference to the injector assembly 200.

When using the pouch 120 in accordance with the present invention, starting with an empty cartridge assembly 100, that is, not having any water therein, and with the injector head (not shown) and injector head 180 removed. The piston 150 is in a first position at the distal end 110a of the housing 110. A pouch 120 retrieved from storage and connected to the injector head (not shown). If the injector head 180 is being used, it is separated, as shown in FIG. 5, so that connector portion 125 of the pouch 120 can be inserted into one part of a space which forms aperture 186 when first and second portions 182, 184 are closed as shown in FIG. 4. First and second portions 182, 184 of the injector head 180 are closed to seal against connector portion 125 of the pouch 120.

The pouch 120 is inserted into the housing 110 through the proximal end 110b. The injector head 180 is mounted to the proximal end 110b of the housing 110 and sealed with respect thereto.

The external heater 160 is turned on and water is introduced into the chamber 115 of the housing 110 through aperture 110c, as indicated by arrow 145, to fill the chamber. Excess water flows through aperture 110d back to the reservoir as indicated by arrow 140. Once the chamber 115 is full of water, the water supply is closed off so that a predetermined volume of water is present in the chamber 115.

The external heater 160 heats the housing 110 which transfers heat to the water through conduction. The water is heated until it reaches 80° C. and allowed to stabilise within the chamber 115. The heated water heats the body portion 122 of the pouch 120 and the resin therein so that it attains a suitable viscosity to form the resin supply 130 for the injector head (not shown).

The piston 150 at the distal end 110a of the housing 110 is then moved in the direction of arrow 155 to pressurise the water within the chamber 115. Pressurisation of the water compresses the body portion 122 of the pouch 120 in a controlled manner allowing resin to flow through the connector portion 125 and outlet 127 to form a precisely-controlled resin supply 130 for the mould (not shown). The position of the piston within the housing can be precisely measured and controlled using a stepper motro, for example, with the pressurisation of the water, that is, the hydrostatic pressure, also being measured. The position of the piston is directly related to the applied hydrostatic pressure and hence the flow of the material from the pouch.

Once the required amount of resin has been dispensed from the pouch 120 to the injector head, the piston 150 is moved in a direction opposite to that shown by arrow 155 and the chamber 115 is emptied of water. The heater 160 is turned off and the injector head is detached from the housing 110. The injector head 180 is opened and the emptied pouch 120 is removed therefrom and discarded. The cartridge 100 is ready to be used with a new pouch 120.

In another embodiment, the pouch may be supplied with connecting tube and shut-off valve attached. In this case, all that is necessary to connect the resin flow from the pouch to the mould is to connect the valve to the mould and to locate the pouch in the chamber of the housing prior to sealing the housing with the injector head as described above. In such an embodiment, the split injector head is necessary to allow the connecting tubing and valve connected to the pouch to be accommodated within the injector head. Naturally, complementary attachment means may be provided on the connector portion of the pouch and the split injector head which engage one another to hold the pouch in position in place within the housing.

In another embodiment, if the split injector head is not used, the connector portion 125 may be fixed to the injector head 180 by means of an externally threaded portion which engages with a complementary internally threaded aperture formed in the injector head. In this embodiment, connecting tubing may be pre-connected to the connector portion of the pouch, with the connecting tubing being connected to an internally threaded portion of the connector. The connecting tubing is sized to pass through the internally threaded aperture formed in the injector head and connectable to a valve, either prior to connection at the mould or at the mould itself.

Depending on the size of the aperture in the injector head, it may be possible that the valve may be small enough to pass directly therethrough. In this case, the pouch may be provided with the connecting tubing and with the valve attached to an end of the connecting tubing remote from the pouch.

FIG. 7 is similar to FIG. 1 and illustrates a schematic cross-sectioned view of an assembled injector assembly 500 in accordance with a fourth embodiment of the present invention. The injector assembly 500 comprises a housing 510 having a distal end 510a and a proximal end 510b with a chamber 515 having an adjustable volume defined between the distal end and the proximal ends 510a, 510b. The housing 510 is closed by a piston 550 at the distal end 510a and a removable injector head 580 at the proximal end 510b as described above.

A pouch 520 is mountable within the chamber 515 of the housing 510, and, comprises a body portion 522 and a connector portion 525 which is in fluid communication with the interior of the body portion 522. In this embodiment, the connector portion 525 is attached to a distal end of the body portion 522 and loops upwardly through the removable injector head 580 to dispense a resin supply 530 from the pouch 520. In this embodiment, with the orientation as shown with the distal end being lower than the proximal end, gravity assists in the flow of material from the body portion 522 to form the resin supply 530.

The body portion 522 of the pouch 520 is attached to the removable injector head 580 by means of a hook 520a which is configured to engage with a corresponding loop or eye 580a formed on an inner surface of the removable injector head 580 as shown.

In this embodiment, the connector portion 525 is only supported by the injector head and can be connected directly to the mould by means of a valve (not shown).

Apertures 510c, 510d are provided in one wall of the housing 510 for connection to a water supply (not shown) with water entering the housing 510, as shown by arrow 545, and exiting from the housing 510, as shown by arrow 540. Apertures 510c, 510d comprise a respective inlet and outlet for the water.

The water supply may comprise a reservoir which feeds the housing 510 (arrow 545) during a fill phase and receives the water returned from the housing 510 (arrow 540) during an empty phase. A pump may be provided for filling the chamber 515 with water from the reservoir and for emptying water from the chamber into the reservoir. In an alternative embodiment, the water supply may comprise any other suitable means as described above.

Although a water supply is described, a supply of any other suitable inert fluid may be used. By the term "inert" is meant not reactive to the resin within the pouch. Other fluids capable of applying a determinable hydrostatic pressure to the pouch may be used.

The piston 550 at the distal end 510a of the housing 510 is configured for adjusting, that is, reducing, the volume of the chamber 515 of the housing 510 by movement in the direction of arrow 555. As the volume in the chamber 515 is decreased, the water therein transfers pressure to the pouch 520 thereby compressing the body portion 522 thereof to cause resin to flow from the body portion 522 through the connector portion 525 to provide the resin supply 530 to the mould (not shown).

As before, the housing 510 and the piston 550, define a sealed piston arrangement in which the pouch 520 is located when the injector head 580 is sealed to the housing 510.

The piston 550 may be operated by any suitable motor (not shown) under the control of a system controller (also not shown). In one embodiment, the motor comprises an electric motor, and, in another embodiment, a pneumatic or hydraulic actuator may be used to move the piston 550 in the direction of arrow 555. The piston 550 may be heated to transfer heat to the water and then to the resin material within the pouch 520.

As described above, the piston 550 comprises a seal configuration which enables high pressure to be maintained within the chamber 515 when the piston 550 is moved in the direction indicated by arrow 555. In effect, the piston 550 forms a moveable end wall at the distal end 510a of the housing 510 and the pressure sensor 570 is mounted therein. The seal configuration is provided between the piston 550 and the internal wall 510f of the housing 510 so that water does not escape between the piston and the internal wall of the housing.

An external heater 560, for example, an electrical heater, may be provided along external wall 510e of the housing 510 to heat the wall of the housing and to ensure that the water in the chamber 515 thereof is at a suitable temperature enabling the resin to flow freely from the body portion 522 of the pouch 520 as described above. The external heater 560 may be provided in addition to, or as an alternative to, heating the piston 550.

As described above, the water is heated to around 80° C. so that it is at a lower temperature than the injection temperature so that the resin material in the body portion 522 does not reach its exothermic reaction temperature.

A pressure sensor 570 is provided to measure the pressure exerted on the water within the chamber 515 of the housing 510 due to movement of the piston in the direction of arrow 555, thereby providing an indication of the hydrostatic pressure applied to the pouch 520. In this case, the pressure sensor 570 is shown in the piston 550 but may be mounted in any other suitable location in the injection assembly, for example, the injector head 580 or through the external wall 510e of the housing 510, as described above.

The mounting of the injector head 580 mounted to the proximal end 510b of the housing 510 is as described above with reference to FIG. 1 and includes a locking mechanism 585 is provided over the injector head 580 to lock it in position. The locking mechanism 585 operates as described above with reference to FIG. 1.

A bubble degasser 590 is provided in the injector head 580 to remove bubbles within water in the chamber 515 so that the pressure applied by the piston 550 does not compress air bubbles within the water reducing the pressure applied to the pouch 520. This removal of air bubbles ensures that the measured pressure is or is related to the hydrostatic pressure that is applied to the pouch.

An RFID tag 595 is provided on the pouch 520 so that the properties etc. of the resin therein can readily be determined after filling of the pouch as described above.

Although the embodiment of FIG. 5 is shown as being similar to the embodiment shown in FIG. 1, it will readily be appreciated that the particular mounting arrangement for the pouch 520 with its connector element 525 in the form of an elongate tube extending from the distal end of the body portion 522 can be implemented in the embodiments shown in FIGS. 2 and 3 with suitable modifications. As a result, modifications of FIGS. 2 and 3 are not described or illustrated.

The pouch of the present invention can be retrofitted to existing injection moulding assemblies by a secure connection to the injector head as the piston already forms part of these assemblies. Only water needs to be added between the pouch and the housing of the injector assembly. The water may be pre-heated to a suitable temperature, or, if an external heater is also added, the water may be heated in situ inside the housing of the injector assembly. In an alternative embodiment, the piston is metal and is heated by electrical resistance to heat the water.

As will readily be appreciated, there is no need to clean the cartridge 100 to remove any remaining resin from parts of the injector assembly as the remaining resin is contained within the pouch 120 which is discarded after use.

In one embodiment, the water supplied to the chamber 115 may be heated prior to being added to the chamber and the heater 160 is used to maintain the temperature.

Whilst water has been described as being the heating and pressurising liquid, other suitable liquids can be used.

The pouches may be of different sizes to contain differing amounts of resin material. The amount of resin material and the type thereof is indicated in the RFID tag positioned on the body portion of the pouch after it has been filled with degassed resin. The RFID tag may also be positioned on the connector portion as an alternative or as an addition. Each cartridge assembly may be configured to accommodate one size of pouch or several different sizes of pouches. It will be appreciated that by filling the housing of the injector assembly with water, it is possible to use the same cartridge for different sizes of pouches.

In further non-illustrated embodiments, an automatic bleed valve may be present on the injector head to evacuate air. Such a valve may be a central heating floating type valve.

By improving injector system safety, there is no need to move the system to a safety area in the case of exothermic reaction. Moreover, a one-to-one relationship may be attained between injector assemblies and moulds or presses compared to presently having one injector for 2 or 3 moulds or presses. The injection system becomes more compact and easier to use.

An injection moulding system using the pouch of the present invention enables the injector system mounted next to the mould or press as the risk of exothermic reactions is substantially reduced. Even if such a reaction is initiated, the pouch can rapidly be cooled down whilst it is still in the housing of the injector system.

By having an injector head which is in two parts, it is possible to install easily a pouch to which connecting tubing and shut-off valve are already installed. The work of the operator of the injector system then becomes limited to connecting the valve to the mould, closing the injector head and disassembling after injection at the valve. Although the resin will still be liquid in the connecting tubing connected to the mould after injection, the risk of resin being spread over the injection moulding workshop and operator contact with the resin is substantially reduced as the still-liquid resin is confined within the connecting tubing and does not have contact with the air.

Whilst specific embodiments of the housing of the injector assembly have been illustrated and described, it will readily be understood that other configurations are also possible.

The invention claimed is:

1. An injector assembly comprising:
   a housing having a distal end and a proximal end;
   a chamber formed within the housing, the chamber being configured to have an adjustable volume;
   a piston configured to be located at the distal end of the housing and configured for adjusting the volume of the chamber by movement thereof relative to the proximal end of the housing;
   an injector head configured for retaining a pouch within the housing wherein the pouch comprises a body portion configured to form a material reservoir for an injectable material, and a connector portion configured to be in fluid communication with the body portion for providing a material supply from the material reservoir in the body portion, and wherein the body portion is configured to be compressible to provide the material supply through the connector portion in accordance with applied hydrostatic pressure; and
   a motor configured to control the movement of the piston within the chamber, wherein the chamber is holding a fluid, wherein the injector head is configured for retaining the pouch within the chamber of the housing such that the fluid is around the pouch, wherein the motor is configured to control the movement of the piston within the chamber such as to apply a hydrostatic pressure to the pouch by applying hydrostatic pressure in the fluid around the pouch by adjusting the volume of the chamber so as to transfer pressure from the fluid to the pouch to compress the pouch within the chamber to cause the material to dispense from the pouch through the connector portion; and
   the chamber further comprising a pressure sensor configured for sensing the hydrostatic pressure within the fluid in the chamber.

2. An injector assembly according to claim 1, further comprising:
   at least one aperture formed in the housing, the at least one aperture being configured as a fluid outlet for discharging fluid from the chamber that is introduced into the chamber through the proximal end of the housing.

3. An injector assembly according to claim 2, wherein the fluid is an incompressible fluid.

4. An injector assembly according to claim 3, wherein the fluid comprises at least one of water and pre-heated water.

5. An injector assembly according to claim 3, further comprising:
   a bubble degasser configured for degassing the fluid within the chamber.

6. An injector assembly according to claim 1, wherein the motor comprises a stepper motor.

7. The injector assembly according to claim 1, wherein the injector assembly comprises the pouch.

8. The injector assembly according to claim 7, wherein the body portion is configured to be conductive to transfer heat to the material in the material reservoir.

9. The injector assembly according to claim 7, wherein the pouch further comprises an identifier configured to provide information about the injectable material within body portion.

10. The injector assembly according to claim 7, wherein the body portion comprises at least one of an elastomeric material and a synthetic polymeric material.

11. The injector assembly according to claim 10, wherein the elastomeric material comprises at least one of polyurethane, natural rubber, polybutadiene, neoprene and silicone.

12. The injector assembly according to claim 10, wherein the synthetic polymer comprises at least one of polypropylene, polyethylene, polyvinyl chloride, polyester, nylon and polyethylene terephthalate.

13. The injector assembly according to claim 7, wherein the injectable material comprises a thermosetting resin material.

14. The injector assembly according to claim 13, wherein the thermosetting resin material is degassed and sealed within the body portion.

15. The injector assembly according to claim 7 wherein the connector portion of the pouch is attached to a distal end of the body portion of the pouch and loops upwardly through the injector head to dispense a resin supply from the pouch such that the distal end of the pouch is lower than the proximal end of the pouch, and such that gravity assists in the flow of material from the body portion of the pouch.

16. The injector assembly according to claim 15, wherein the body portion of the pouch is attached to the injector head by means of a hook which is configured to engage with a corresponding loop or eye formed on an inner surface of the injector head.

17. A method for injecting material into a mould using an injector assembly, the method comprising the steps of:
   connecting a pouch containing material to be injected to an injector head of an injector assembly, the injector assembly comprising:
   a housing having a distal end and a proximal end;
   a chamber formed within the housing, the chamber configured to have an adjustable volume;
   a piston located at the distal end of the housing and configured for adjusting the volume of the chamber by movement thereof relative to the proximal end of the housing;
   an injector head configured for retaining a pouch within the housing wherein the pouch comprises a body portion configured to form a material reservoir for an injectable material, and a connector portion configured to be in fluid communication with the body portion for providing a material supply from the material reservoir in the body portion, and wherein the body portion is configured to be compressible to provide the material supply through the connector portion in accordance with applied hydrostatic pressure; and
   a motor configured to control the movement of the piston within the chamber;
   the chamber is holding a fluid;
   the injector head retaining the pouch within the chamber of the housing such that the fluid is around the pouch;
   the motor controlling movement of the piston within the chamber to apply a hydrostatic pressure to the pouch by applying hydrostatic pressure in the fluid around the pouch by adjusting the volume of the chamber;

connecting the pouch to a mould;

compressing the pouch via the movement of the piston within the chamber to dispense material from the pouch for the mould, by filling the chamber with a predetermined amount of fluid and pressurising the fluid in the chamber so as to transfer pressure from the fluid to the pouch to dispense the material therefrom; and sensing a hydrostatic pressure within the fluid in the chamber via a pressure sensor disposed within the chamber.

18. A method according to claim 17, further comprising:

degassing the fluid in the chamber.

19. A method according to claim 17, further comprising the step of:

controlling material flow from the pouch in accordance with the applied hydrostatic pressure.

20. A method according to claim 17, further comprising the steps of:

disconnecting the injector head from the mould in response to determining that a desired amount of material has been dispensed from the pouch;

removing the injector head from the housing;

removing the pouch from the injector assembly; and discarding the pouch.

\* \* \* \* \*